United States Patent
Nakamura

(10) Patent No.: US 7,946,835 B2
(45) Date of Patent: May 24, 2011

(54) CASTING DEVICE, SOLUTION CASTING APPARATUS, AND SOLUTION CASTING METHOD

(75) Inventor: Naoki Nakamura, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 8 days.

(21) Appl. No.: 12/360,691

(22) Filed: Jan. 27, 2009

(65) Prior Publication Data

US 2009/0194901 A1 Aug. 6, 2009

(30) Foreign Application Priority Data

Feb. 1, 2008 (JP) .................................. 2008-022308

(51) Int. Cl.
*B29C 47/04* (2006.01)
(52) U.S. Cl. ........... 425/133.5; 264/171.25; 264/172.19; 264/173.11
(58) Field of Classification Search ............. 264/172.19, 264/171.25, 173.11; 425/133.5
See application file for complete search history.

(56) References Cited

U.S. PATENT DOCUMENTS

2005/0214472 A1* 9/2005 Ito et al. ................. 427/420

FOREIGN PATENT DOCUMENTS

| JP | 2002-221620 A | | 8/2002 |
| JP | 2002221620 A | * | 8/2002 |

OTHER PUBLICATIONS

Machine Translation of JP-2002-221620-A.*

* cited by examiner

*Primary Examiner* — Yogendra N Gupta
*Assistant Examiner* — Robert J Grun
(74) *Attorney, Agent, or Firm* — Sughrue Mion, PLLC

(57) ABSTRACT

In a feed block, a main conduit and sub conduits are formed. High-viscosity dope flows through the main conduit, and low-viscosity dope flows through the sub conduits. Distribution pins are disposed in a joint portion where the sub conduits intersect with the main conduit for controlling the flow volume of the low-viscosity dope. A tapered cutout is formed in the peripheral surface of the distribution pin. The distribution pin is attached in such an orientation that a wider side of the cutout coincides with the lower reaches of a dope flow. Since ledges are formed in both ends of the cutout, the amount of the low-viscosity dope flowing through the cutout is smaller in both widthwise ends than in the middle.

2 Claims, 10 Drawing Sheets

CASTING DEVICE, SOLUTION CASTING APPARATUS, AND SOLUTION CASTING METHOD

FIELD OF THE INVENTION

The present invention relates to a casting device, a solution casting apparatus, and a solution casting method.

BACKGROUND OF THE INVENTION

A polymer film (hereinafter referred to as film) has advantages such as excellent light transmission properties and flexibility, and is easy to make lighter and thinner. Accordingly, the film is widely used as an optical functional film. In particular, a cellulose ester film made of cellulose acylate or the like further has advantages such as toughness and low birefringence in addition to the above advantages. Therefore, the cellulose ester film is used as various kinds of optical functional films from a photographic sensitive film to a protective film for a polarizing filter and an optical compensation film as components of a liquid crystal display (LCD) whose market is increasingly expanded in recent years.

There are two main manufacturing methods of a film described above, that is, a melt extrusion method and a solution casting method. In the melt extrusion method, after polymers without a solvent are heated and melt, an extruder extrudes the polymers to manufacture a film. The melt extrusion method has advantages such as high productivity and relatively low equipment cost. In the melt extrusion method, however, it is difficult to precisely control the thickness of the film. In addition, since extrusion causes fine streaks (die lines) in the film, it is difficult to manufacture a high quality film which is available as an optical functional film. In the solution casting method, on the other hand, a solution containing polymers and a solvent is casted onto a casting support by using a casting die. A cast film formed on the casting support is hardened to have a self-supporting property and then is stripped from the casting support as a wet film. Then, the wet film is dried and wound as a film. The film manufactured by the solution casting method is superior to that manufactured by the melt extrusion method in terms of optical isotropy and uniformity in thickness and contains less foreign matter. Accordingly, the solution casting method is adopted for manufacturing the optical functional film.

In the case of manufacturing a multilayer film having a plurality of layers in a thickness direction, a casting device is used. The casting device includes a feed block and a casting die. A relatively high-viscosity polymer solution (hereinafter called high-viscosity dope) and a relatively low-viscosity polymer solution (hereinafter called low-viscosity dope) are supplied to the feed block. The supplied high-viscosity dope and the low-viscosity dope are sent to a joint portion in the feed block through a high-viscosity dope conduit and a low-viscosity dope conduit, respectively. In the joint portion, the high-viscosity dope and the low-viscosity dope are laminated to form multilayer dope. Then, the multilayer dope is sent to the casting die. A width increasing slot portion of the casting die widens the width of the multilayer dope in a direction orthogonal to a lamination direction by compression in the lamination direction. The multilayer dope, the width of which is widened, is ejected from an ejection outlet of the casting die onto a casting support as a multilayer cast film in which the high-viscosity dope and the low-viscosity dope are laminated each other in the thickness direction. After that, a multilayer film is obtained in the same manner as described above.

In the multilayer cast film, surface layers made of the low-viscosity dope and a base layer made of the high-viscosity dope are laminated in the thickness direction. The multilayer cast film may be comprised of, for example, a single low-viscosity dope layer and a single high-viscosity dope layer laminated each other, or two low-viscosity dope layers and one high-viscosity dope layer sandwiched between the low-viscosity dope layers. The high-viscosity dope is of such composition as to have optical properties need for the film. The low-viscosity dope is of such composition as to improve deterioration in surface smoothness, in stripping, and the like occurring during manufacturing, or ease handling of the film after manufacturing. Thus, it is possible to manufacture a multilayer film which has required optical properties, even thickness, and smooth surfaces.

In a conventional feed block, the length of an outlet of the high-viscosity dope was equal to the length of an outlet of the low-viscosity dope in a width direction in a joint portion. When a multilayer cast film is made by such a feed block, a part of the low-viscosity dope in the middle of the width direction flows into both widthwise ends and wraps around the high-viscosity dope. The so-called wraparound phenomenon occurs.

In the both widthwise ends of the multilayer cast film, where the wraparound phenomenon has occurred, the surface layer becomes thicker than in a middle portion. Since the low-viscosity dope contains a higher concentration of solvent and a lower concentration of polymers as compared with the high-viscosity dope, the both widthwise ends are hard to be a self-supporting state. Accordingly, when the multilayer cast film is stripped from the support, the both widthwise ends remain thereon. Once the low-viscosity dope remains, the remaining low-viscosity dope starts depositing. As a result, the film tears from its ends. Also, the widthwise ends of the multilayer cast film, where the wraparound phenomenon has occurred, contain a larger amount of solvent than the middle portion. Accordingly, bubbles tend to occur at ends in drying the whole multilayer cast film. Then, the film tears from a bubbled portion.

According to a casting device disclosed in Japanese Patent Laid-Open Publication No. 2002-221620, distribution pins having a cutout of a predetermined width are disposed in a joint portion of a feed block. Since low-viscosity dope flows into the joint portion through the cutout, the width of the low-viscosity dope becomes narrower than that of high-viscosity dope in multilayer dope and hence it is possible to prevent the wraparound phenomenon.

However, there were cases where the wraparound phenomenon occurred even if using the distribution pins described above. As a result of diligent study, the inventors have found out that controlling the depth of both widthwise ends of a cutout prevents the occurrence of the wraparound phenomenon.

SUMMARY OF THE INVENTION

In view of above, an object of the present invention is to provide a casting device which can prevent a part of dope from remaining on a casting support and manufacture a multilayer cast film having a surface layer with a uniform thickness. Another object of the present invention is to provide a solution casting apparatus and a solution casting method for making a multilayer film having a surface layer with a uniform thickness from the multilayer cast film by using the casting device.

To achieve the above objects, a casting device according to the present invention forms a multilayer casting film in which a first dope containing polymers and a solvent and a second dope having lower viscosity than the first dope are stacked in a first direction being a film thickness direction. The casting device comprises a feed block, a distribution pin, and a casting die. The feed block forms a multilayer dope flow by merging a second dope flow into a first dope flow, which are independently led, at a joint portion. The distribution pin is provided in the joint portion for controlling the volume of the second dope flow. The distribution pin has a cutout, and a ledge is provided at an end of the cutout in a second direction orthogonal to the first direction. The second direction coincides with a width direction of the casting film. The ledge reduces the volume of the second dope flow flowing through the cutout at an end in the second direction than that in a middle portion. The casting die extends the width of the multilayer dope flow led from the feed block in the second direction and ejects the multilayer dope flow out of an outlet. The multilayer dope flow becomes the multilayer casting film on a travelling casting support.

In the casting device, the ledge is projected from a side face toward a middle portion of the cutout. The ledge satisfies the following expressions:

$$13 \leq W1/W2 \leq 30$$

$$1.5 \leq D1/(D1-D2) \leq 5$$

wherein, W1 represents the width of the cutout, W2 represents the width of the ledge, D1 represents the depth of the cutout, and D2 represents the depth of the ledge.

The casting device further satisfies the following expression:

$$10 \leq W4/W3 \leq 30$$

wherein, W3 represents the length of the joint portion in the second direction and W4 represents the length of the outlet in the second direction.

A solution casting apparatus according to the present invention manufactures a polymer film. The solution casting apparatus comprises a casting support, a feed block, a distribution pin, a casting die, and a drying device. The casting support travels at a speed of at least 30 m/min, and forms a multilayer casting film thereon. The feed block forms a multilayer dope flow by merging a second dope flow into a first dope flow, which are independently led, at a joint portion. The distribution pin is provided in the joint portion for controlling the volume of the second dope flow. The distribution pin has a cutout, and a ledge is provided at an end of the cutout in a second direction. The second direction coincides with a width direction of the casting film. The ledge reduces the volume of the second dope flow flowing through the cutout at an end in the second direction as compared with that in a middle portion. The casting die extends the width of the multilayer dope flow led from the feed block in the second direction and ejects the multilayer dope flow out of an outlet onto the casting support. The drying device dries the casting film stripped from the casting support to be the polymer film.

According to the present invention, a solution casting method for forming a polymer film comprises the steps of: independently feeding a first dope containing polymers and a solvent and a second dope having lower viscosity than the first dope into a feed block; forming a multilayer dope by merging the second dope into the first dope at a joint portion of the feed block; forming a multilayer casting film by ejecting the multilayer dope led from the feed block onto a travelling casting support without ends; stripping the multilayer casting film from the casting support as a wet film containing the solvent; and drying the stripped wet film to be the polymer film. A first dope conduit and a second dope conduit intersect with each other at the joint portion, and the first dope and the second dope are independently fed into the first dope conduit and the second dope conduit, respectively. The flow volume of the second dope is reduced at both ends thereof as compared with that in a middle portion before the second dope is merged into the first dope. The casting support travels at a speed of at least 30 m/min.

In the solution casting method, the width of the polymer film is between or equal to 2500 mm and 4000 mm. The polymer is cellulose acylate.

According to the present invention, the ledges which are provided at both ends of the cutout reduce the amount of the second dope flow flowing through the cutout than that in the middle portion. Thus, it is possible to inhibit the occurrence of a wraparound phenomenon, prevent a cast film from remaining on the casting support without being stripped, and manufacture the multilayer film having a surface layer with a uniform thickness.

BRIEF DESCRIPTION OF THE DRAWINGS

One with ordinary skill in the art would easily understand the above-described objects and advantages of the present invention when the following detailed description is read with reference to the drawings attached hereto.

DESCRIPTION OF THE PREFERRED EMBODIMENTS

Taking the case of manufacturing a three-layered casting film as an example, an embodiment of the present invention will be hereinafter described in detail. Three layers denote a first surface layer making contact with a casting support, an exposed second surface layer, and an intermediate layer between the first and second layers. The present invention, however, is not limited to the embodiment.

[Solution Casting Method]

Figure 1:
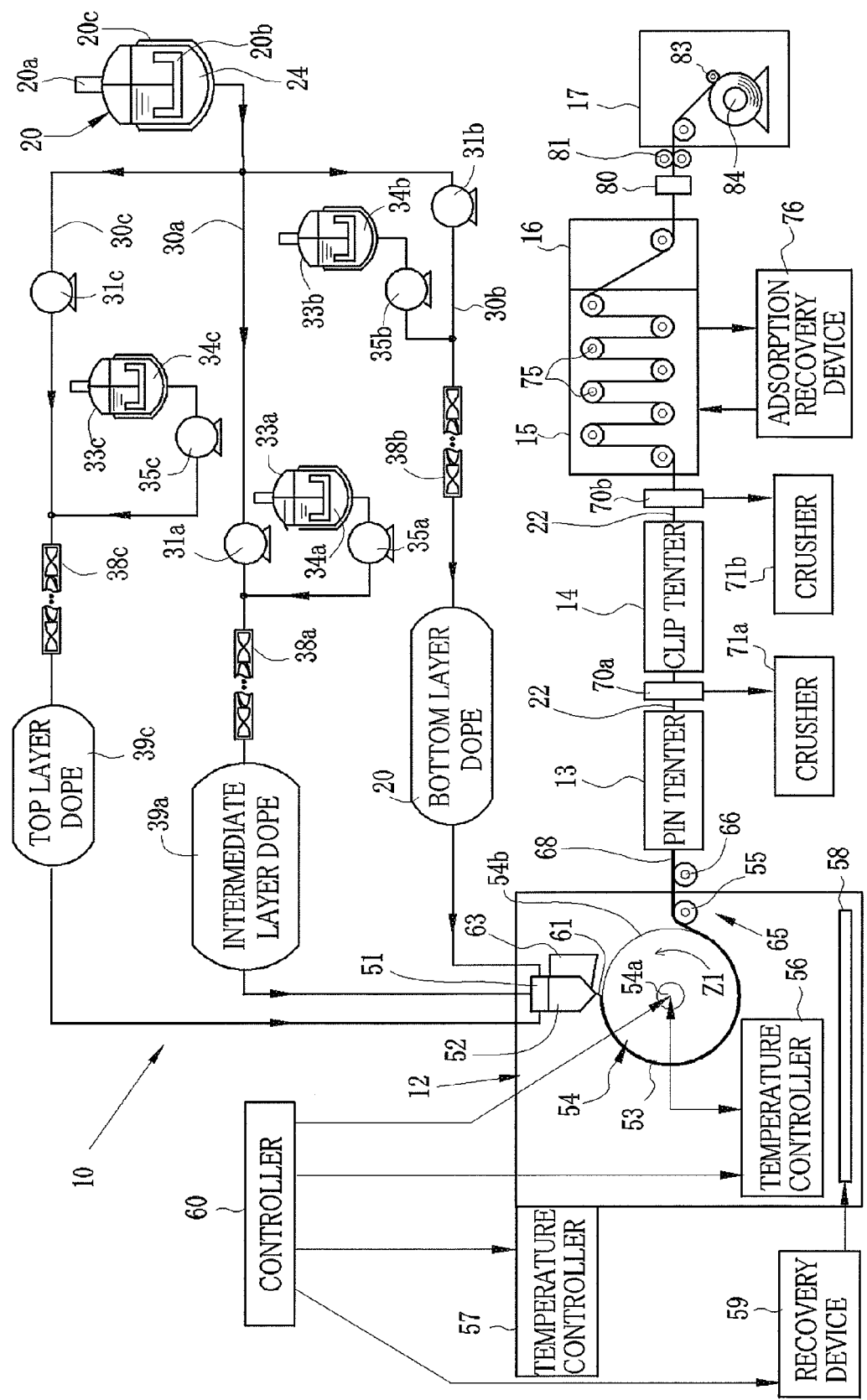
FIG. 1 is a schematic view of a film manufacturing line.

As shown in FIG. 1, a film manufacturing line 10 is composed of a casting chamber 12, a pin tenter 13, a clip tenter 14, a drying chamber 15, a cooling chamber 16, and a winding chamber 17.

A stock tank 20 is connected to the casting chamber 12 through dope conduits described later on. The stock tank 20 is provided with a stirring blade 20b, a motor 20a for rotating the stirring blade 20b, and a jacket 20c. The stock tank 20 contains dope 24 being a mixture of polymer which is a raw material of a film 22 and a solvent. The jacket 20c provided on the periphery of the stock tank 20 keeps the dope 24 at an approximately constant temperature. The stirring blade 20b rotates to always keep the dope 24 in a uniform state without coagulation of the polymer.

An intermediate layer dope conduit 30a, a bottom layer dope conduit 30b, and a top layer dope conduit 30c connect the stock tank 20 to a feed block 51 in parallel. Pumps 31a to 31c provided in the dope conduits 30a to 30c, respectively, are connected to a not-illustrated controller. The controller makes the pumps 31a to 31c send predetermined amounts of dope 24. It is preferable to use gear pumps as the pumps 31a to 31c.

A stock tank 33a is connected to the intermediate layer dope conduit 30a through piping. The stock tank 33a contains an intermediate layer additive liquid 34a. A pump 35a is provided in the piping which connects the stock tank 33a to the dope conduit 30a. The pump 35a sends the additive liquid 34a in the stock tank 33a to the dope conduit 30a for the purpose of adding the additive liquid 34a to the dope 24 in the dope conduit 30a. Then, a static mixer 38a provided in the dope conduit 30a stirs and mixes the dope 24 and the additive liquid 34a into a uniform mixture. The mixture will be hereinafter referred to as intermediate layer dope 39a. As the intermediate layer additive liquid 34a, a solution (or dispersed solution) containing an additive such as an ultraviolet absorbing agent, a retardation control agent, or a plasticizer in advance is used.

The bottom layer dope conduit 30b and the top layer dope conduit 30c have the same structure as the intermediate layer dope conduit 30a. Liquid and equipment connected to the bottom layer dope conduit 30b has reference numbers ending in "b". Solution and equipment connected to the top layer dope conduit 30c has reference numbers ending in "c" and detailed description thereof is omitted. A bottom layer additive liquid 34b and a top layer additive liquid 34c contain an additive such as a release improver (for example, citrate) for facilitating stripping of a film away from a support drum being a casting support, a matting agent (for example, silicon dioxide) for preventing a film from sticking to itself when being wound into a roll, or a deterioration inhibitor in advance. The bottom layer additive liquid 34b and the top layer additive liquid 34c may contain an additive of a plasticizer or an optical property control agent such as an ultraviolet absorbing agent or a retardation control agent. A mixture stirred in the bottom layer dope conduit 30b is referred to as bottom layer dope 39b, and a mixture stirred in the top layer dope conduit 30c is referred to as top layer dope 39c.

Using the dope 39a to 39c, a method described later on will be carried out to manufacture a multilayer film. The intermediate layer dope 39a has strength and optical properties required of a film to be manufactured. The bottom layer dope 39b and the top layer dope 39c improve smoothness and slip of the film. In addition to above, it is preferable that the viscosity of the bottom layer dope 39b and the top layer dope 39c is lower than that of the intermediate layer dope 39a. Accordingly, it is possible to prevent the occurrence of a surface defect such as streaks and unevenness and thickness variation in a cast film and a wet film as described later on.

[Dope Concentration]

The polymer concentration of the intermediate layer dope 39a is between or equal to 15 wt. % and 30 wt. %, and preferably between or equal to 20 wt. % and 25 wt. %. The polymer concentration of the bottom layer dope 39b and the top layer dope 39c is between or equal to 10 wt. % and 25 wt. %, preferably between or equal to 15 wt. % and 25 wt. %, and more preferably between or equal to 19 wt. % and 22 wt. %.

The casting chamber 12 is provided with a feed block 51, a casting die 52, a casting support drum 54 being a support, a stripping roller 55, temperature controllers 56 and 57, a condenser 58, and a solvent recovery device 59. The feed block 51 forms multilayer dope out of three kinds of dope 39a to 39c. The casting die 52 having a slot ejects the multilayer dope onto the support drum 54, and the multilayer dope is made into a cast film 53 on the support drum 54. The stripping roller 55 strips the cast film 53 from the support drum 54. A controller 60 controls the support drum 54, the temperature controllers 56 and 57, the solvent recovery device 59, and the like.

The condenser 58 condenses and liquefies solvent vapor in the casting chamber 12. Under the control of the controller 60, the solvent recovery device 59 recovers the liquefied solvent condensed by the condenser 58 to keep a vapor dew point TR in the atmosphere of the casting chamber 12 within a predetermined range. The gas dew point is a temperature at which the solvent vaporized in the atmosphere of the casting chamber 12 starts condensing. The recovered solvent is recycled by a recycler and reused as a dope preparing solvent. Under the control of the controller 60, the temperature controller 57 keeps the temperature of the casting chamber 12 within a predetermined range.

[Casting Support Drum]

The controller 60 rotates the casting support drum 54 about a shaft 54a in Z1 direction via a not-illustrated driving device. By the rotation of the support drum 54, a peripheral surface 54b travels in the Z1 direction at predetermined speed ZV. The temperature controller 56 circulates a heat exchange medium conditioned at required temperature throughout a flow path formed inside the support drum 54 for the purpose of keeping the peripheral surface 54b of the support drum 54 at required temperature TS.

The width of the support drum 54 is not particularly limited but a preferable width is 1.1 to 2.0 times as long as the casting width of the dope. The peripheral surface 54b is so ground that surface roughness becomes 0.01 μm or less. The peripheral surface 54b has to be designed to minimize a surface defect. To be more specific, it is preferable that there is no pinhole of 30 μm or more. There is one or less pinhole of 10 μm or more and less than 30 μm per square meter, and there are two or less pinholes of 10 μm or less per square meter. It is preferable that the positional variation of the peripheral surface 54b in a radial direction by rotation of the support drum 54 is 200 μm or less. The speed variation of the support drum 54 is at most 3%, and the positional variation of the support drum 54 in a width direction is at most 3 mm per turn.

The support drum 54 is made of stainless steel and is preferably made of SUS316 which has enough resistance to corrosion and strength. The peripheral surface 54b of the support drum 54 is subjected to the so-called hard chrome plating, which is defined by Vickers hardness Hv of 700 or more and thickness of 2 μm or more.

The feed block 51 forms multilayer dope 61 (refer to FIG. 2) out of the dope 39a to 39c sent through the dope conduits 30a to 30c and sends multilayer dope 61 at a predetermined flow volume to the casting die 52. The casting die 52 ejects the multilayer dope 61 onto the peripheral surface 54b of the rotating support drum 54 as the cast film 53. While the support drum 54 makes an approximately three-quarters turn, the cooled cast film 53 is hardened to have a self-supporting property, and then the stripping roller 55 strips the cast film 53 away from the support drum 54.

A decompression chamber 63 may be disposed upstream from the casting die 52 in the Z1 direction. The decompression chamber 63 reduces pressure at the rear face (surface which makes contact with the peripheral surface 54*b* of the support drum 54 later) of casting bead. The decompression chamber 63 can reduce pressure in an area upstream from the casting bead within a range between or equal to 10 Pa and 2000 Pa. Since reducing pressure can lessen the adverse effect of wind accompanying the rotation of the support drum 54, it is possible to form stable casting bead between the casting die 52 and the support drum 54 and form the cast film 53 with less thickness variations.

Downstream from the casting chamber 12, a transfer portion 65, the pin tenter 13, and the clip tenter 14 are disposed in this order. The transfer portion 65 leads a wet film stripped by the stripping roller 55 to the pin tenter 13 by using a roller 66. The pin tenter 13 has a lot of pin plates which pierce and hold both side edges of the wet film 68. While the pin plates move on track with holding the wet film 68, the wet film 68 is dried by dry air to be a film 22.

The clip tenter 14 has a lot of clips for holding the both side edges of the film 22. While the clips move on track with holding the film 22, the film 22 is stretched in a width direction and is also dried by dry air. The clip tenter 14 may be omitted.

Downstream from the pin tenter 13 and the clip tenter 14, edge slitters 70*a* and 70*b* are provided, respectively. The edge slitters 70*a* and 70*b* slit both side edges of the film 22. The slit edges are sent to crushers 71*a* and 71*b* by an air blow, pulverized into small pieces, and recycled as material of dope and the like.

There are a lot of rollers 75 in the drying chamber 15. Each of the rollers 75 is wrapped partially with the film 22 for carriage. A not-illustrated air conditioner controls the temperature, humidity, and the like of the drying chamber 15. The film 22 is subjected to drying processing while passing through the drying chamber 15. An adsorption recovery device 76 connected to the drying chamber 15 adsorbs and recovers the solvent evaporated from the film 22.

The cooling chamber 16 is provided at an exit of the drying chamber 15. The film 22 is cooled to room temperature in the cooling chamber 16. A static eliminator (neutralization bar) 80 provided downstream from the cooling chamber 16 removes electricity from the film 22. Knurling rollers 81 are provided downstream from the static eliminator 80 to knurl both side edges of the film 22. In the winding chamber 17, a winder 84 having a press roller 83 is disposed to wind the film 22 around a core into a roll form.

Figure 2:
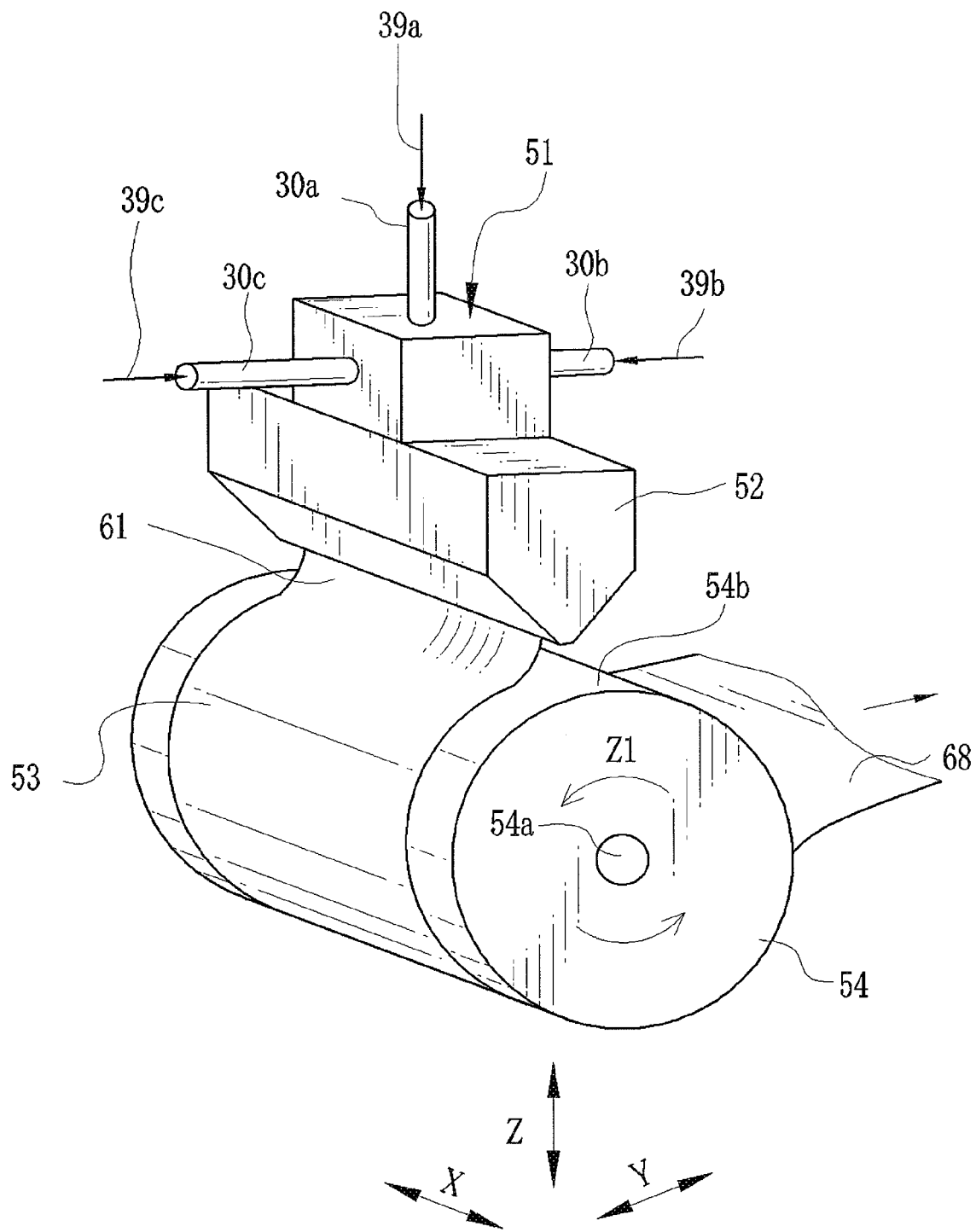
FIG. 2 is a perspective view of a feed block, a casting die, a support drum, and their peripheral devices.

Next, the feed block 51 and the casting die 52 will be described in detail. In the following description, as shown in FIG. 2, when X, Y, and Z refer to three directions orthogonal to one another, the X direction coincides with a width direction of the casting film, that is, a width direction of the ejection outlet 115. The Y direction refers to a direction orthogonal to the X direction, and the Z direction refers to a height direction.

[Feed Block]

Figure 3:
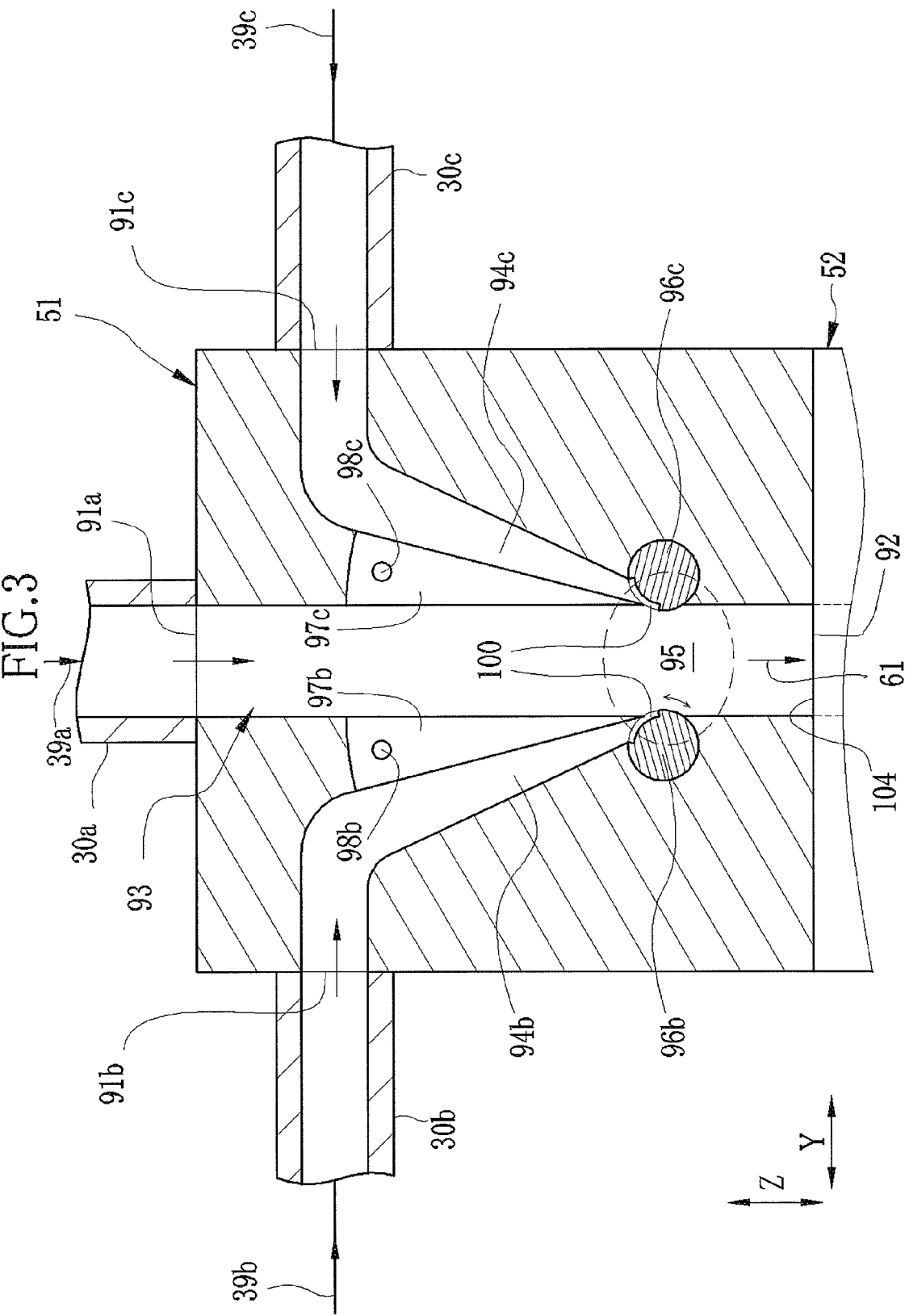
FIG. 3 is a sectional view of the feed block taken on Y-Z plane.

Referring to FIG. 3, in the feed block 51, a main conduit 93 and sub conduits 94*b* and 94*c* are formed. The sub conduits 94*b* and 94*c* are merged into the main conduit 93 at a joint portion 95. The main conduit 93 is so formed as to penetrate the middle of the feed block 51 in the Z direction. A first inlet 91*a* is formed in the top face of the feed block 51 and an outlet 92 is formed in the bottom face thereof. The bottom face is adjacent to the casting die 52.

Figure 4:
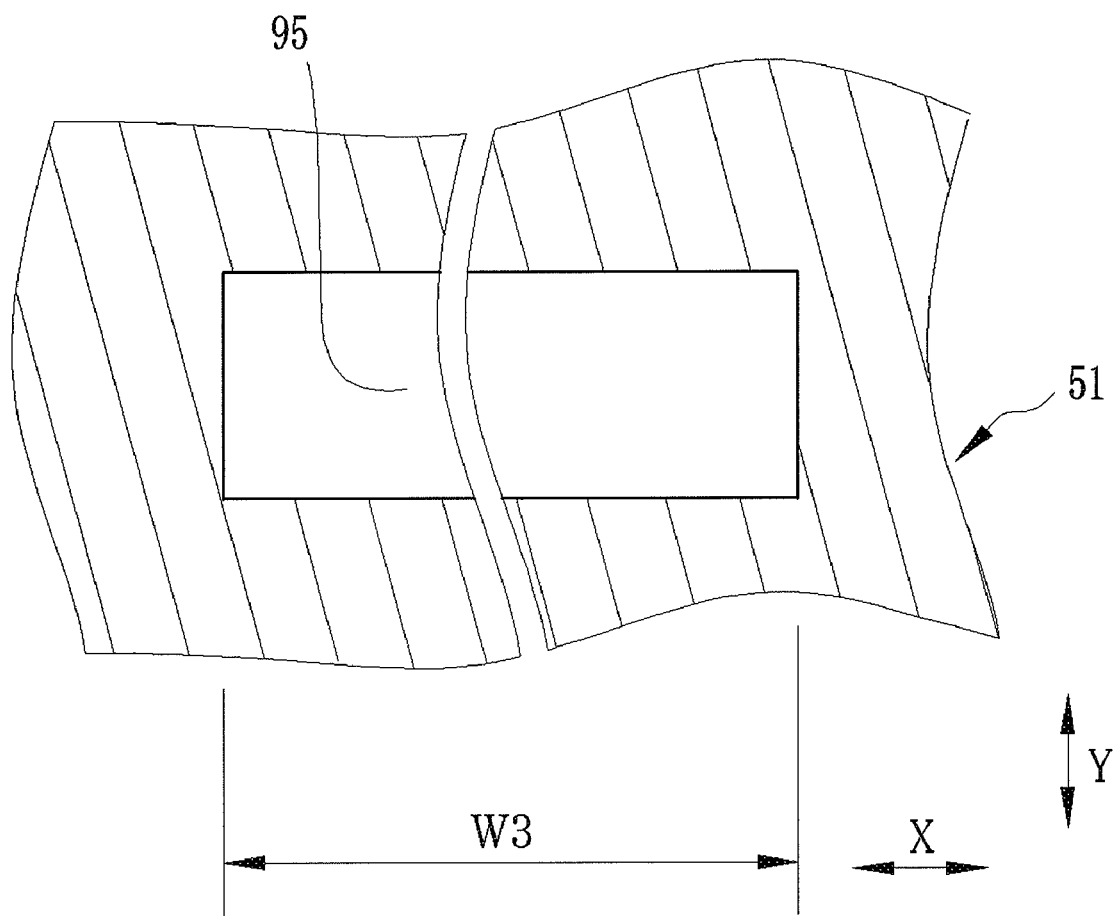
FIG. 4 is a sectional view of a joint portion taken on X-Y plane.

As shown in FIG. 4, the cross section of the main conduit 93 is a rectangle long in the X direction. FIG. 4 shows the cross section of the main conduit 93 at the joint portion 95.

As shown in FIG. 3, the sub conduits 94*b* and 94*c* are so formed as to head for the inside of the feed block 51 from both sides in the Y direction. The sub conduits 94*b* and 94*c* are merged into the main conduit 93 at the joint portion 95. The sub conduits 94*b* and 94*c* intersect with the main conduit 93 at acute angles so that each dope flowing through the sub conduits 94*b* and 94*c* is smoothly merged into a dope flow in the main conduit 93.

In the joint portion 95, vanes 97*b* and 97*c* as partition plates are attached between the main conduit 93 and the sub conduit 94*b* and between the main conduit 93 and the sub conduit 94*c* movably with respect to attachment shafts 98*b* and 98*c*, respectively. A distribution pin 96*b* is disposed at an outlet of the sub conduit 94*b* in the joint portion 95 in such a manner that the longitudinal direction of the distribution pin 96*b* is in the X direction. In a like manner, a distribution pin 96*c* is disposed at an outlet of the sub conduit 94*c* in such a manner that the longitudinal direction of the distribution pin 96*c* is in the X direction. The vanes 97*b* and 97*c* may be omitted.

The distribution pins 96*b* and 96*c* are disposed symmetrically about the main conduit 93 in the feed block 51. Details on the distribution pin 96*c* will be hereinafter described and the distribution pin 96*b* is identical to the distribution pin 96*c*.

Figure 5:
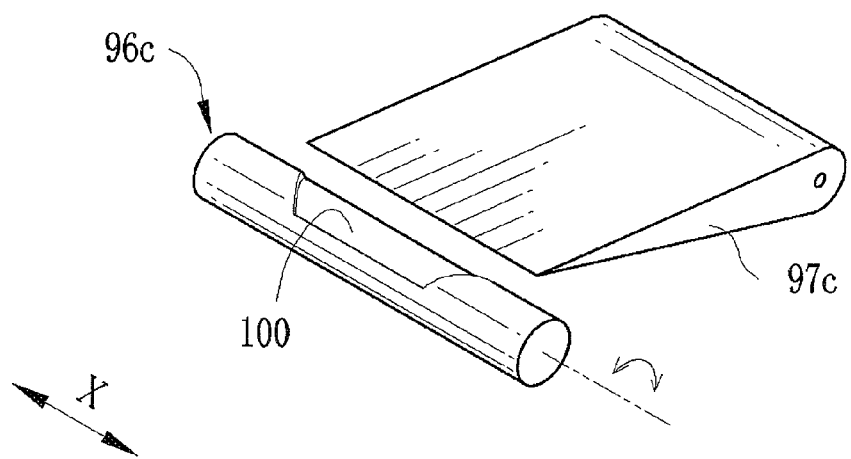
FIG. 5 is a perspective view showing a first distribution pin and a vane.

Referring to FIGS. 3 and 5, a cutout 100 is formed in a part of the peripheral surface of the distribution pin 96*c*. The cutout 100 connects the sub conduit 94*c* to the joint portion 95.

Figure 6:
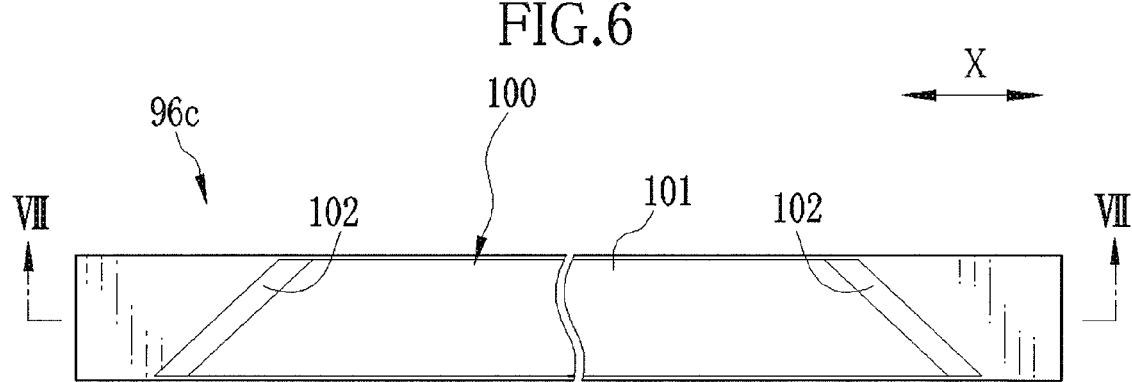
FIG. 6 is a side view of the first distribution pin.
Figure 7:
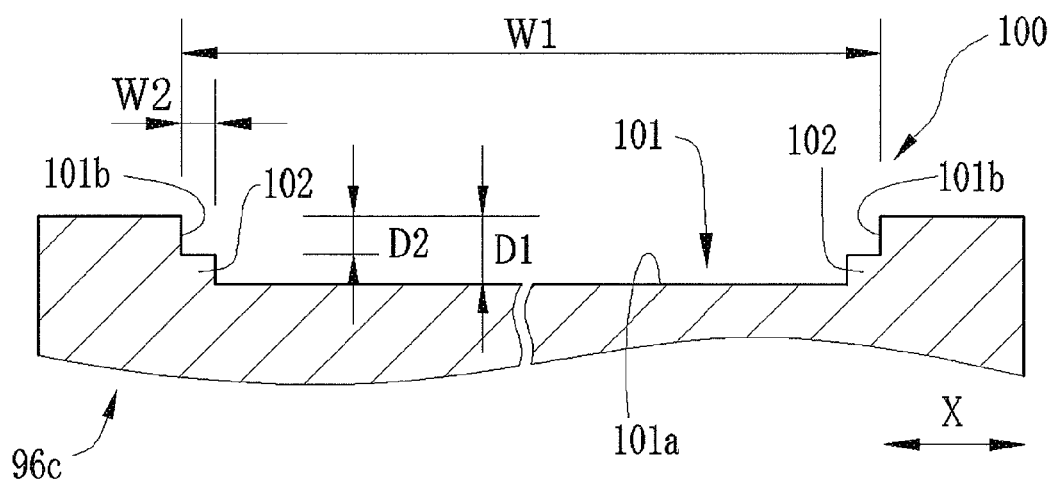
FIG. 7 is a sectional view of the first distribution pin taken on line VII-VII in FIG. 6.

Referring to FIGS. 6 and 7, the cutout 100 consists of a recessed portion 101 and ledges 102. The width W1 of the cutout 100 is smaller than the width W3 of the main conduit 93 (refer to FIG. 4) in the X direction. As shown in FIGS. 5 and 6, the width W1 of the cutout 100 tapers down in a circumferential direction, and the distribution pin 96*c* is attached in such an orientation that a wider side coincides with the lower reaches of a dope flow. The ledges 102 being flow volume reducing portions are formed from both end faces of the cutout 100 in the X direction to the bottom face 101*a* of the recessed portion 101. D2 represents the depth of the ledge 102 in the radial direction and W2 represents the width of the ledge 102 in the X direction. In addition to that, when D1 represents the depth of the recessed portion 101 in the radial direction, D1−D2 expresses height from the bottom face 101*a* to the ledge 102. The depth D1 of the recessed portion 101 in the radial direction is approximately constant in the X direction and the circumferential direction. Furthermore, since the width W2 and depth D2 of the ledge 102 are approximately constant, the height (D1−D2) is approximately constant too in the circumferential direction.

[Casting Die]

Figure 8:
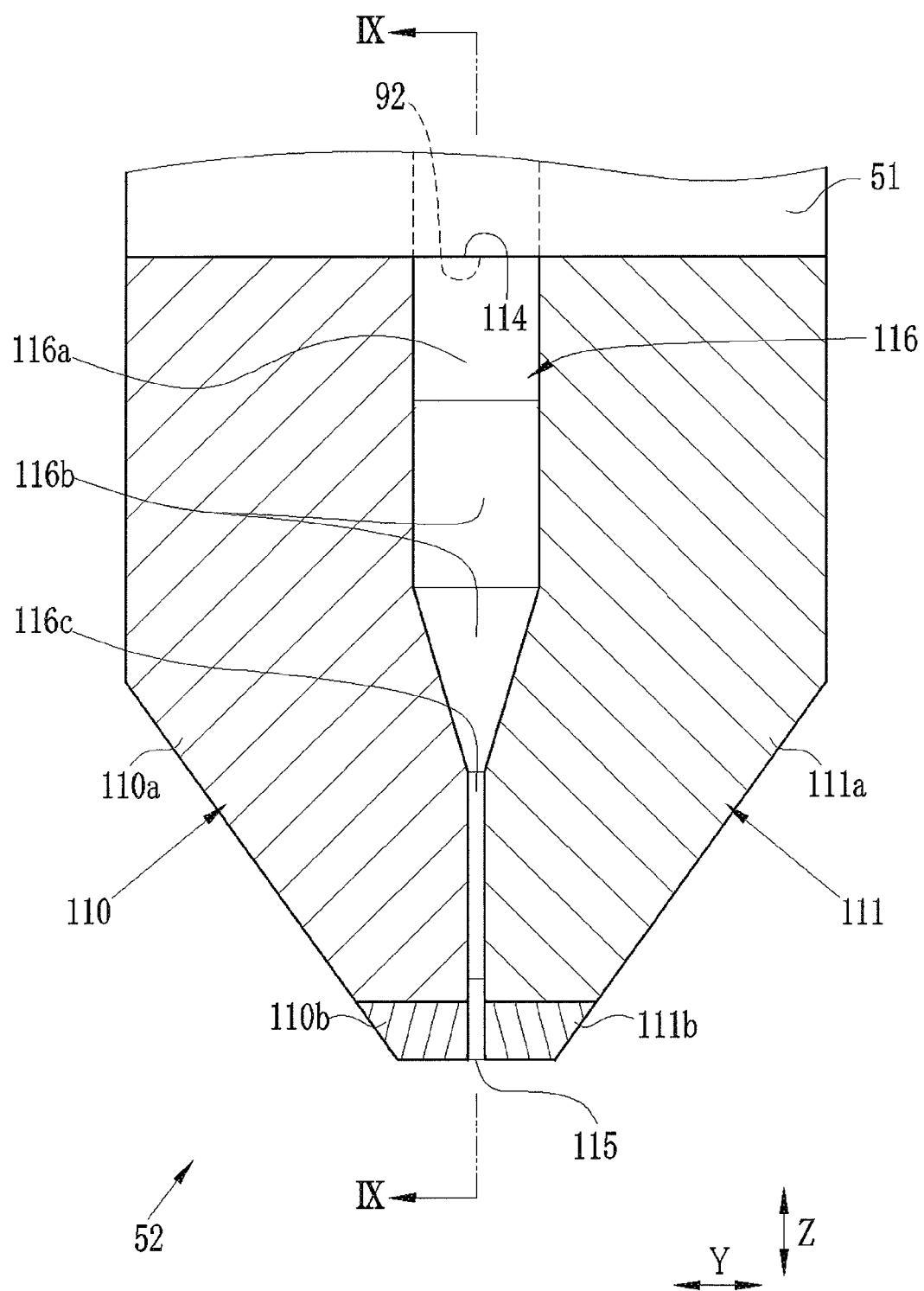
FIG. 8 is a sectional view of the casting die taken on line VIII-VIII in FIG. 9.
Figure 9:
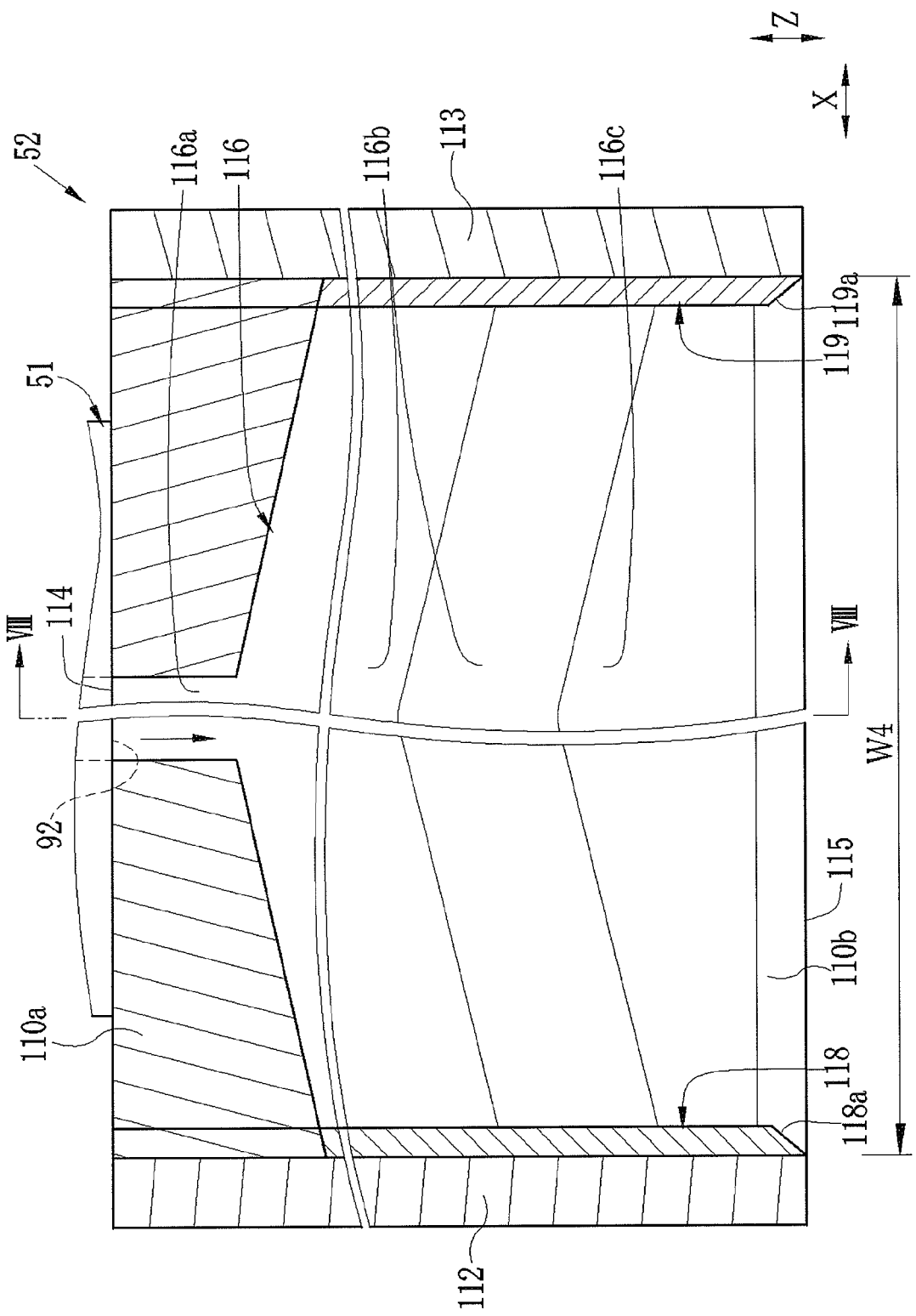
FIG. 9 is a sectional view of the casting die taken on line IX-IX in FIG. 8.

As shown in FIGS. 8 and 9, the casting die 52 is provided with lip plates 110 and 111 and side plates 112 and 113. The lip plates 110 and 111 and the side plates 112 and 113 form a slot 116 in the casting die 52. The slot 116 connects a die inlet 114, which communicates with the outlet 92 of the feed block 51, to an ejection outlet 115 for ejecting the multilayer dope 61.

The lip plate 110 has a plate body 110*a* and a lip portion 110*b*. The lip portion 110*b* is provided at an end of the plate body 110*a* on the side of the ejection outlet 115. The lip plate 111 has a plate body 111*a* and a lip portion 111*b* in a like manner.

The slot 116 has a first slot portion 116*a*, a width increasing slot portion 116*b*, and a second slot portion 116*c* disposed in this order from the side of the die inlet 114 to the side of the ejection outlet 115. The ejection outlet 115 takes the shape of a rectangle long in the X direction and has a width of W4.

Viewing the cross section (X-Y plane) of the multilayer dope 61 in a direction orthogonal to a flow, the width of the width increasing slot portion 116b in the X direction is wider than that of the first slot portion 116a. Width in the Y direction gradually narrows with moving downstream.

Inner deckle plates 118 and 119 are provided inside the slot 116 in the vicinity of the ejection outlet 115 as necessary. It is preferable to dispose the inner deckle plates 118 and 119 at both ends of the slot 116 in the X direction. In the case of using the inner deckle plates 118 and 119, the slot may refer to an area surrounded by the lip plates 110 and 111 and the inner deckle plates 118 and 119. The distance between inclined faces 118a and 119a in the vicinity of the ejection outlet 115 may be W4.

It is preferable that the lip plates 110 and 111 and the inner deckle plates 118 and 119, which compose the feed block 51 and the casting die 52, are made of precipitation-hardened stainless steel. It is also preferable to use a material having a thermal expansion coefficient of $2 \times 10^{-5}$ (1/° C.) or less. A material which has approximately the same corrosion resistance as SUS316 according to a corrosion test using an electrolyte solution is also available. Furthermore, the material has such corrosion resistance that pitting does not occur in a gas-liquid interface even if being soaked in a liquid mixture of dichloromethane, methanol, and water for three months. In addition, it is preferable that the casting die 52 is made of a material which has been reserved for one month or more after being molded and then has been grinded. Accordingly, it is possible to uniform surfaces of the multilayer dope 61 flowing through the slot 116 of the casting die 52.

As for precision in finishing inner walls of the slot 116, the main conduit 93, and the sub conduits 94b and 94c (refer to FIG. 3), it is preferable that surface roughness is 3 μm or less and straightness is 1 μm/m or less in any direction. The average width of the slot 116 in the Y direction is automatically adjustable within a range of 0.5 mm to 3.5 mm. The shear rate of the dope 39a to 39c in the slot 116 is adjusted between 1 and 5000 (1/s).

Every components of the casting die 52, particularly the lip portions 110b and 111b in the vicinity of the ejection slot 115 and inner wall surfaces of the slot 116 may be subjected to predetermined surface treatment. As an example of the surface treatment, there are ceramic coating, hard chrome plating, nitriding processing, and the like. In carrying out the ceramic coating, it is preferable to use ceramic which can be grinded. The ceramic has low porosity and resistance to brittleness and corrosion. In addition to above, the ceramic tightly contacts to the casting die 52 and does not contact to the dope. To be more specific, there are tungsten carbide (WC), $Al_2O_3$, TiN, $Cr_2O_3$, and the like and WC is preferable in particular. WC coating is carried out by thermal spraying, vapor deposition, or the like.

It is preferable that the casting die 52 is provided with a temperature controller (for example, a heater, a jacket and the like) to keep the casting die 52 at constant temperature during manufacturing the film. It is also preferable to use the casting die 52 of a coat hunger type. Furthermore, gap adjustment bolts (heat bolts) may be attached to the lip portions 110b and 111b at regular intervals as an automatic gap control mechanism. A profile of the heat bolts is set by a preset program in accordance with the volume of a liquid flow sent by the pumps 31a to 31c (high-precision gear pumps are preferable, refer to FIG. 1). The heat bolts may be feedback controlled by an adjustment program based on a profile of a thickness meter (for example, an infrared thickness meter, not illustrated in FIG. 1) in the film manufacturing line 10. It is preferable that difference in thickness between arbitrary two points of the film 22 except for a casting edge is adjusted within 1 μm. The thickness variation of the film 22 in the width direction is adjusted within 3 μm per meter. It is also preferable to use a casting die in which thickness precision is adjusted within ±1.5 μm.

Next, referring to FIG. 1, an example of a method for manufacturing the film 22 by the film manufacturing line 10 will be described. The stock tank 20 keeps the dope 24 at approximately constant temperature within a range of 25° C. or more to 35° C. or less by flowing the heat transfer medium inside the jacket 20c, and always uniforms the dope 24 by rotating the stirring blade 20b.

The intermediate layer dope 39a is prepared from the dope 24 contained in the stock tank 20 and the specified intermediate layer additive liquid 34a. The prepared intermediate layer dope 39a is sent to the feed block 51 through the dope conduit 30a. In a like manner, the bottom layer dope 39b is prepared from the dope 24 and the specified additive liquid 34b, and the top layer dope 39c is prepared from the dope 24 and the specified additive liquid 34c. The prepared bottom layer dope 39b and top layer dope 39c is sent to the feed block 51 through the dope conduits 30b and 30c, respectively. The feed block 51 stacks the dope 39a to 39c into the multilayer dope 61 and sends it to the casting die 52. Details on the multilayer dope 61 in the feed block 51 and the casting die 52 will be described later on.

The temperature controller 56 keeps the peripheral surface 54b of the support drum 54 at approximately constant temperature TS within a range of −20° C. or more to 0° C. or less. The support drum 54 rotates about the shaft 54a. Thus, the peripheral surface 54b travels in the Z1 direction at speed of ZV. The speed ZV is between or equal to 30 m/min and 200 m/min, and preferably between or equal to 40 m/min and 150 m/min. The casting die 52 casts the multilayer dope 61 onto the support drum 54 to form the cast film 53. The cast film 53 cooled on the peripheral surface 54b is hardened to have the self-supporting property. Then, the stripping roller 55 strips the gel-like state casting film 53 from the support drum 54 as the wet film 68, and leads it to the pin tenter 13 via the transfer portion 65.

Figure 10:
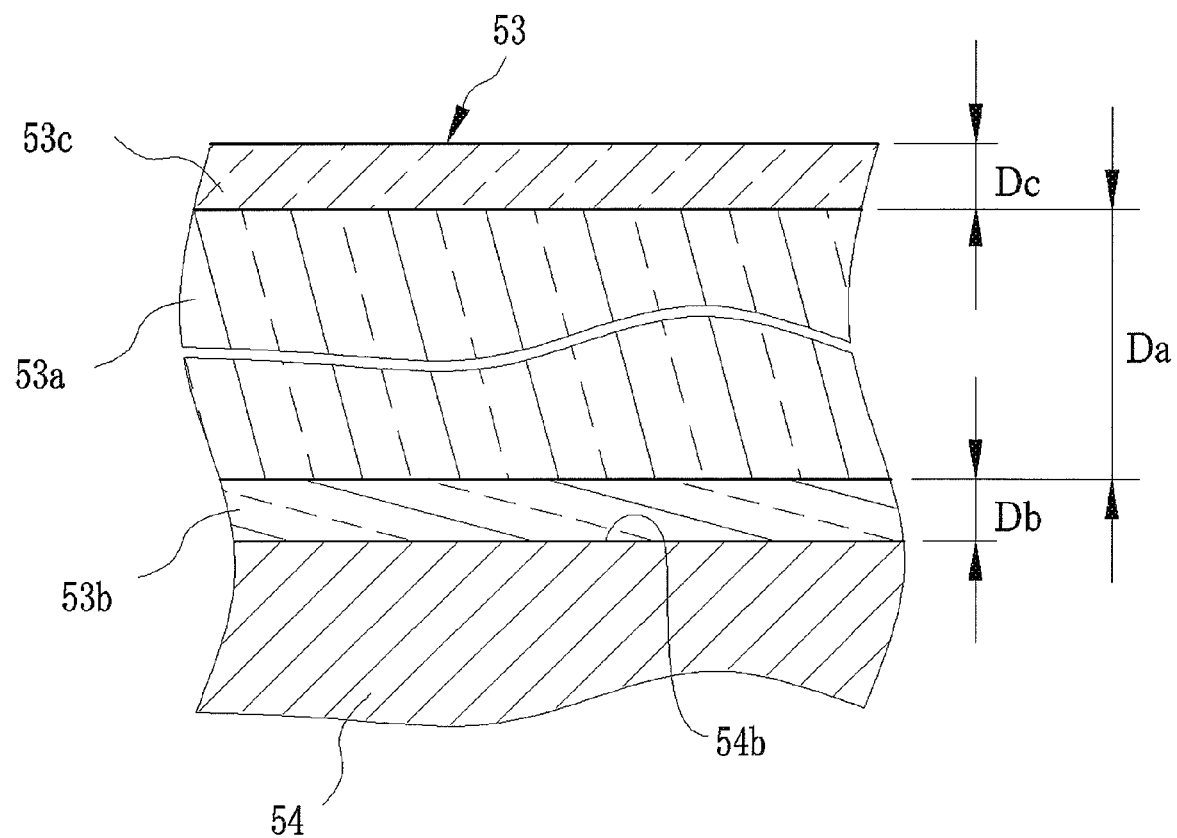
FIG. 10 is a sectional view of a cast film.

In the cast film 53, as shown in FIG. 10, a top layer 53c made of the top layer dope 39c, an intermediate layer 53a made of the intermediate layer dope 39a, and a bottom layer 53b made of the bottom layer dope 39b are stacked in a film thickness direction. The bottom layer 53b becomes a rear face (face making contact with the peripheral surface 54b of the support drum 54) of the cast film 53. The top layer 53c becomes a front face of the cast film 53. The intermediate layer 53a is formed between the top layer 53c and the bottom layer 53b. The intermediate layer 53a becomes a base layer of the film, as described above, and the top layer 53c and the bottom layer 53b becomes surface layers of the film. The thickness rates of individual layers are approximately the same as those of the multilayer dope 61 and the film 22.

When Da represents the thickness of the intermediate layer 53a of the cast film 53, Dc represents the thickness of the top layer 53c, and the Db represents the thickness of the bottom layer 53b, Dc/Da is between or equal to 0.01 and 0.5, and preferably between or equal to 0.04 and 0.3. When Dc/Da is less than 0.01, shearing stress which occurs in the multilayer dope 61 in passing through the slot 116 of the casting die 52 increases. Increase in the shearing stress makes an interface between the top layer dope 39c and the intermediate layer dope 39a unstable and results in variations in thickness. If Dc/Da exceeds 0.5, on the other hand, it becomes difficult to control thickness distribution of the top layer. For similar reasons, Db/Da is between or equal to 0.01 and 0.5, and preferably between or equal to 0.04 to 0.3.

In the pin tenter 13, a lot of pins pierce the both side edges of the wet film 68 to fix it. Then, the wet film 68 is dried to be the film 22 while being carried. The film 22 which still contains the solvent is sent into the clip tenter 14. At this time, it is preferable that the amount of solvent remaining in the film 22 just before being sent to the clip tenter 14 is 50 to 150 wt. %. In this invention, "the amount of remaining solvent" refers to the amount of solvent remaining in the film expressed by a dry base. Taking a sample from a target film, the amount of remaining solvent is calculated by $\{(x-y)/y\} \times 100$ when x represents weight of the sample and y represents weight of the sample after being dried.

In the clip tenter 14, the film 22 is dried while a lot of clips, which continuously move by the operation of chains, carry the film 22 with pinching the both side edges thereof. At this time, opening up the space (film width) between the opposed clips applies tension to the film 22 for the purpose of stretching the film 22 in the width direction. Stretching the film 22 in the width direction aligns molecular orientation in the film 22, so that the film 22 receives a desired retardation value.

The edge slitters 70a and 70b which exit out of the pin tenter 13 and the clip tenter 14, respectively, slit away the both side edges of the film 22. The film 22, the both side edges of which are slit away, passes through the drying chamber 15 and the cooling chamber 16 and then is wound by the winder 84 in the winding chamber 17. Crushers 71a and 71b crush the both side edges of the film 22, which have been slit away by the web edge slitters 70a and 70b, to recycle them as chips for preparing dope.

The film 22 wound by the winder 84 has a length of at least 100 m or more in a longitudinal direction (casting direction). The width of the film 22 is 600 mm or more, and is preferably between or equal to 1400 mm and 2500 mm. The present invention also has an effect on a film having a width of more than 2500 mm. In addition, the present invention is applicable to the case of manufacturing a thin film having a thickness of 20 μm or more and 80 μm or less.

As shown in FIG. 3, a not-illustrated driving portion rotates the distribution pins 96b and 96c about the shafts in the circumferential direction and vanes 97b and 97c about their shafts 98b and 98c. Since the shapes and dimensions of outlets of the sub conduits 94b and 94c at the joint portion 95 are controlled like this, it is possible to control the rate of thicknesses of individual layers in the multilayer dope 61. In the feed block 51, the dope 39a flows into the joint portion 95 through the main conduit 93. The dope 39b and 39c flowing through the sub conduits 94b and 94c flows into the joint portion 95 via the cutouts 100 provided in the distribution pins 96b and 96c, respectively.

Figure 11A:
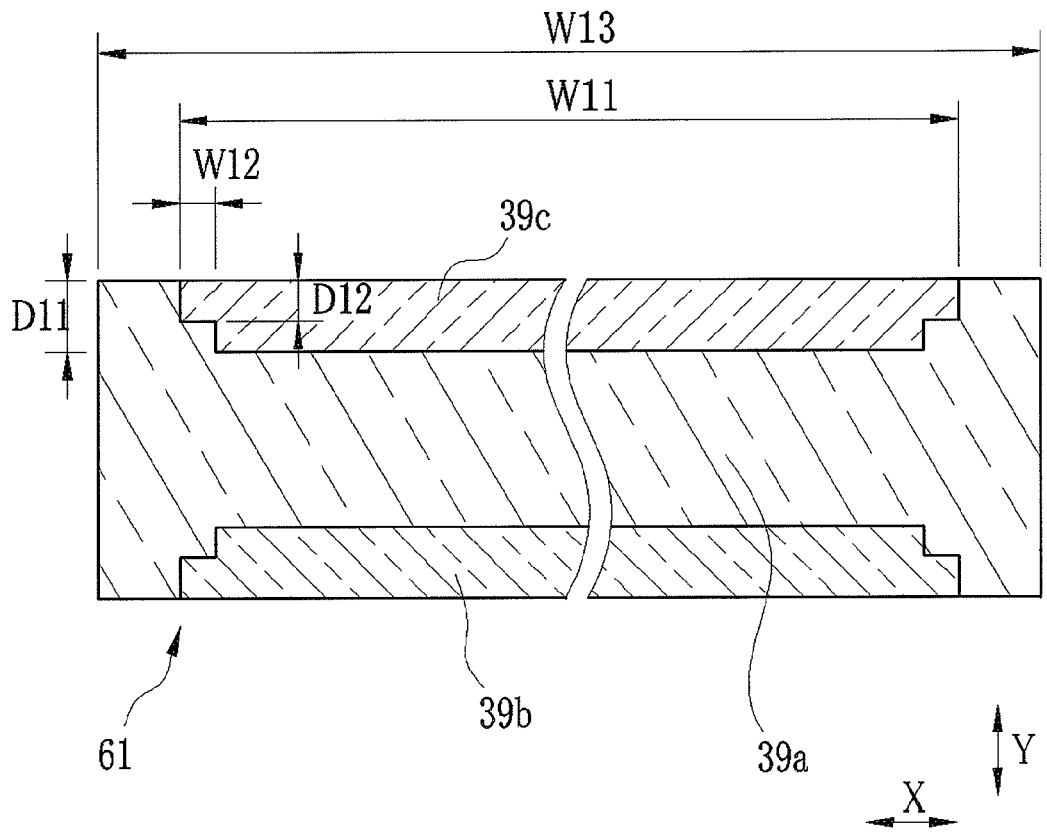
FIG. 11A is a sectional view of multilayer dope at the joint portion taken on X-Y plane.

In the present invention, as shown in FIG. 7, the cutout 100 has the ledges 102. Thus, as shown in FIG. 11A, the X-directional width W11 of portions the dope 39b and 39c occupies (hereinafter called surface portion) is narrower than the X-directional width W13 of a portion the dope 39a occupies. In the surface portion, the thickness D12 of portions formed by the ledges 102 is thinner than the thickness D11 of a middle portion.

Figure 11B:
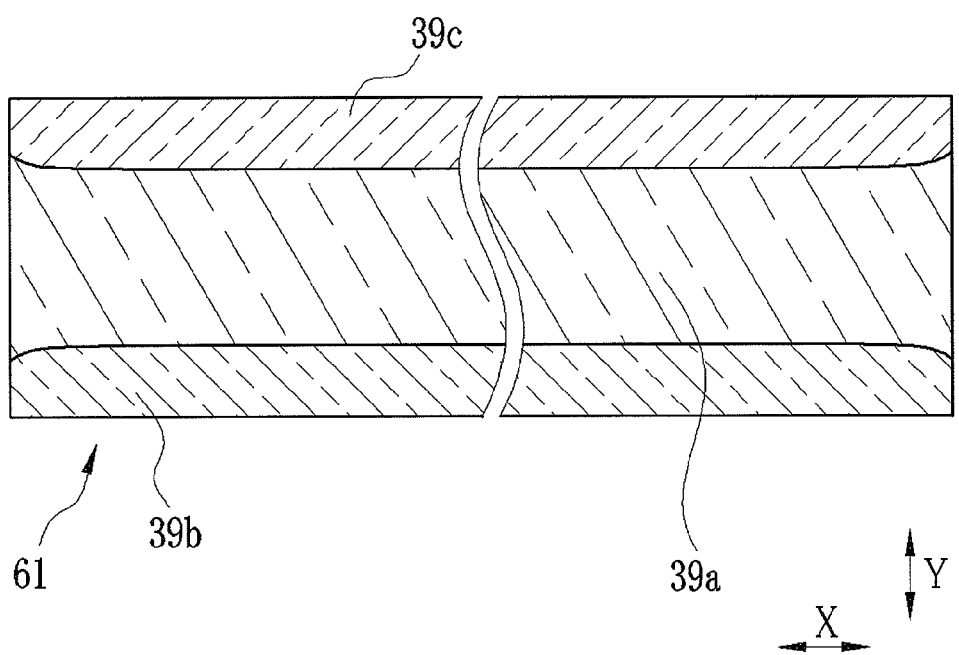
FIG. 11B is a sectional view of the multilayer dope in being ejected from an outlet taken on X-Y plane.

Such multilayer dope 61 is sent to the casting die 52. The multilayer dope 61 is extended in the X direction by compression in the Y direction in the width increasing slot portion 116b, and then is ejected from the ejection outlet 115 onto the peripheral surface 54b. At the time of increasing the width, a part of dope 39b and 39c in the middle of the X direction tends to flow into both X-directional ends as compared with the dope 39a. However, according to the present invention, the multilayer dope 61 has cross-sectional structure of FIG. 11A in the joint portion 95. Accordingly, the multilayer dope 61 has cross-sectional structure of FIG. 11B when being ejected from the outlet 115, and the thicknesses of the surface portions are approximately made uniform in the X direction.

Therefore, according to the casting device of the present invention, since the thicknesses of the surface layers made of the low-viscosity dope 39b and 39c are made uniform in the width direction in the cast film 53, it is possible to manufacture the film 22 having surface layers with uniform thicknesses.

A wraparound phenomenon, being a problem the present invention has solved, is caused by a part of low-viscosity dope flowing into a width increasing direction when a layered product with a plurality of layers having different viscosities is compressed in a layer stacking direction to extend its width in a direction orthogonal to the layer stacking direction. In other words, the wraparound phenomenon is more likely to occur as increase in difference in the viscosity of individual dope composing the multilayer dope 61.

As a main cause of increasing difference in viscosity, there is dope flow speed in the slot 116 of the casting die 52. Since dope is viscoelastic, when dope residence time in a slit is long, in other words, when the speed of dope passing through a slit is reduced, the shearing viscosity of dope is increased. The shearing viscosity of polymer tends to increase with reduction in the dope flow speed, though it depends on the concentration, type, and the like of the polymer contained in the dope. However, in general, when the concentration of the polymer contained in the dope is high or the molecular weight of the polymer is large, the shearing viscosity is conspicuously increased. Accordingly, when multilayer dope which includes plural types of dope having different viscosities flows in the slot 116, reduction in the dope flow speed causes increase in difference in viscosity among plural types of dope. In a solution casting method, on the other hand, it is preferable that the speed of dope passing through a slot is reduced for the purpose of preventing the occurrence of a surface defect such as streaks, surface asperities, and unevenness. Therefore, in the case of manufacturing a multilayer film with preventing the occurrence of above defects, there is a problem that the wraparound phenomenon is likely to occur as described above. The present invention is applicable to the case of manufacturing a multilayer film with preventing the occurrence of above defects. The present invention is conspicuously effective in a case where a value of $\mu_L/\mu_H$ is more than 0 and 0.5 or less and the speed of the multilayer dope 61 flowing through the slot is 30 m/min or more, wherein $\mu_L$ refers to the viscosity of low-viscosity dope and $\mu_H$ refers to the viscosity of high-viscosity dope.

In manufacturing a wide multilayer film, a surface layer becomes thick at some points in a cast film irrespective of the presence or absence of increase in difference in viscosity of plural types of dope. As a result, a part of the film tends to remain without being completely stripped or a bubble tends to appear in the film. Otherwise, if the film is thicker than a predetermined value in a portion to be made into a product, slit edges become larger than ever before for the purpose of removing the thick portion and hence wasted space is increased. Thus, manufacturing efficiency is reduced. The present invention is effective at efficiently manufacturing a wide multilayer film (having a width between or equal to 2500 mm and 4000 mm, for example).

Referring to FIG. 7, in the cutout 100, the value of W1/W2 is between or equal to 13 and 30, and the value of D1/(D1−D2) is between or equal to 1.5 and 5. When the value of W1/W2 is lower than 13 or the value of D1/(D1−D2) is lower than 1.5, the thickness of the dope 39b and 39c in the edges of the film 22 is thinner than that of a middle portion. When the value of W1/W2 is larger than 30 or the D1/(D1−D2) is larger than 5, on the other hand, the thickness of the dope 39b and 39c in the edges of the film 22 is thicker than that of the middle portion.

The radial depth D1 of the cutout 100 of the distribution pin 96b is preferably larger than 0 mm and 5 mm or less, and is more preferably larger than 0 mm and 4 mm or less. When the depth D1 exceeds 5 mm, it becomes difficult to approximately uniform the thickness distribution of the surface layer.

In the sectional view of the multilayer dope 61 shown in FIG. 11A, the width W11 of the surface layer is variable with respect to the width W1 of the cutout 100. In a like manner, the widths W12 and W13 and the depths D11 and D12 are independently variable with respect to dimensions of W2, W3, D1, and D2, respectively.

As shown in FIGS. 4 and 9, the value of W4/W3 is preferably between or equal to 10 and 30. When the value of W4/W3 is lower than 10, the residence time of the multilayer dope 61 in the feed block 51 and the casting die 52 increases, the occurrence of the wraparound phenomenon of the dope 39b and 39c becomes conspicuous not only in the casting die 52 but also in the feed block 51. When the value of W4/W3 exceeds 30, on the other hand, the dope 39b and 39c is difficult to widen in the X direction and the thickness of the cast film 53 is not uniformed in the X direction.

Figure 12:
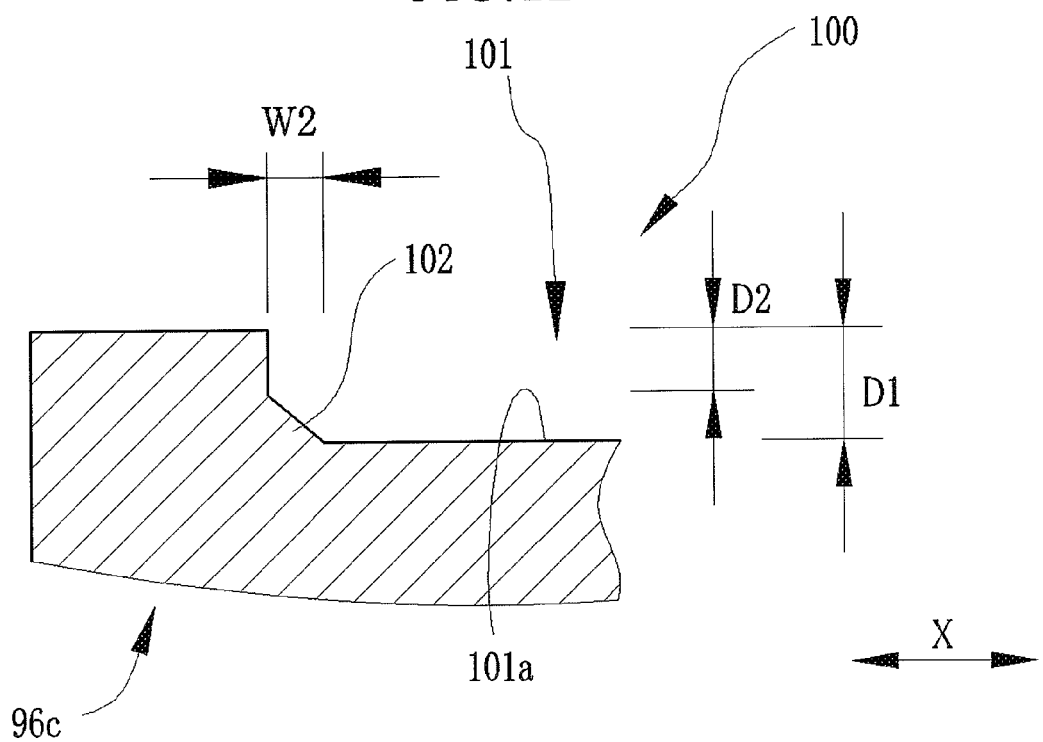
FIG. 12 is an enlarged view of an essential portion in radial cross section of a second distribution pin.
Figure 13:
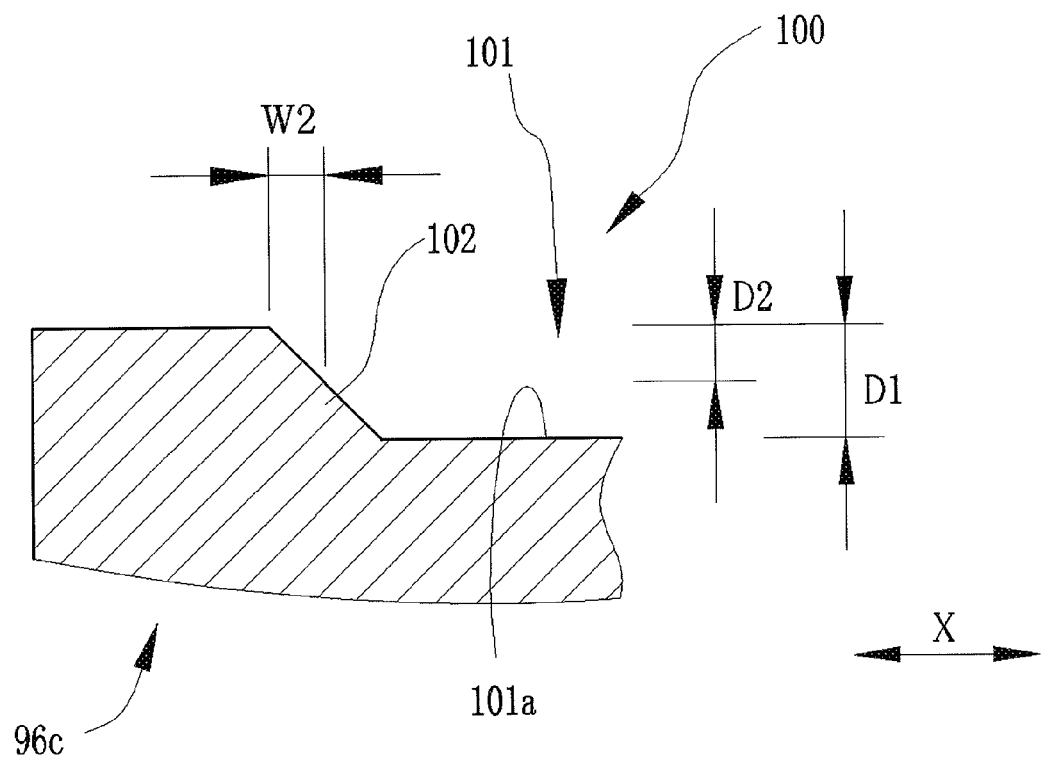
FIG. 13 is an enlarged view of an essential portion in radial cross section of a third distribution pin.

In the above embodiments, the cutout 100 is provided with the ledges 102 having a height of (D1−D2) from the bottom face 101a and a width of W2 in the X direction, but the present invention is not limited to it. For example, as shown in FIGS. 12 and 13, the cutout 100 may be provided with ledges 102 the height from the bottom face 101a of which gradually decreases from both X-directional ends toward the middle. Especially, when the height of the ledge 102 gradually decreases from "D1" to "0" from both X-directional ends toward the middle, as shown in FIG. 13, height in the middle of the ledge 102 in the X direction may be referred to as D2 and width from a portion with height D2 to a portion with height D1 may be referred to as W2. Otherwise, W2 may be width from the portion with height D2 to a portion with height 0. Moreover, the rate of decreasing the height of the ledge 102 from the both X-directional ends toward the middle may be constant or variable. Accordingly, the cutout 100 according to the present invention may be a groove in the shape of the letter U, the letter V, a rectangle, or the like.

In the above embodiment, the distribution pins 96b and 96c are disposed in such an orientation that a wider side of the width W1 of the tapered cutout 100 coincides with the downstream of a dope flow. The width W2 and the depths D1 and D2 of the cutout 100 are approximately constant irrespective of a flow direction, but the present invention is not limited to it. The cutout 100 may be formed in such a manner as to gradually increase at least one of the width W2 and the depths D1 and D2 toward the downstream of a flow direction instead of or together with the width W1.

As a method for casting plural types of dope for manufacturing the multilayer film, co-casting by simultaneous stacking described above, sequential co-casting, or the combination of the two may be available. In carrying out the co-casting by simultaneous stacking, the feed block 51 may be attached to the casting die 52 as described in this embodiment. Otherwise, a casting device in which the casting die 52 and the feed block 51 are integral to each other or a multi manifold casting die (not illustrated) may be used instead. It is preferable in a multilayer film that the thickness of a layer on an air face side (air face layer) or the thickness of a layer on a support side occupies 0.5% to 30% of the whole film thickness. Furthermore, in the case of carrying out the co-casting by simultaneous stacking, it is preferable that low-viscosity dope covers high-viscosity dope in casting the dope out of a die slit onto a casting support. It is preferable to cover inner dope with dope in which the relative proportions of alcohol is larger than that of the inner dope.

In the above embodiment, the cast film 53 is hardened by cooling, but the present invention is not limited to it. The cast film 53 may be hardened by vaporization of a solvent contained in the cast film 53 instead.

In the above embodiment, the support drum 54 is used as a casting support, but the present invention is not limited to it. A casting band which loops over rollers and continuously moves by the rotation of the rollers may be used instead.

In the above embodiment, the multilayer dope 61 is casted onto the rotating support, but the present invention is not limited to it. The multilayer dope 61 may be casted on a static support.

[Polymer]

A material used for preparing the dope 24 in the present invention will be hereinafter described.

In this embodiment, cellulose acylate is used as a polymer. Out of the cellulose acylate, cellulose triacetate (TAC) is especially preferable. Out of the cellulose acylate, a material in which the substitution degree of an acyl group for a cellulose hydroxyl group satisfies all the following expressions (I) to (III) is preferable. In the following expressions (I) to (III), A and B represent the substitution degree of an acyl group for a hydrogen atom in a cellulose hydroxyl group. A represents the substitution degree of an acetyl group, and B represents the substitution degree of an acyl group in which the number of carbon atoms is 3 to 22. It is preferable that particles having a diameter of 0.1 to 4 mm occupy 90 wt. % or more of TAC. However, a polymer available in the present invention is not limited to cellulose acetate.

$$2.5 \leq A+B \leq 3.0 \quad (I)$$

$$0 \leq A \leq 3.0 \quad (II)$$

$$0 \leq B \leq 2.9 \quad (III)$$

The β-1,4 bonded glucose unit composing cellulose has three free hydroxyl groups at positions 2, 3, and 6. Cellulose acylate is a polymer in which a part or all of hydroxyl groups is/are esterified by an acyl group having a carbon number of 2 or more. Acylation degree means a rate at which a hydroxyl group of cellulose is esterified at each of the positions 2, 3, and 6 (when a hydroxyl group is esterified at 100%, acylation degree is 1).

Total acylation degree, that is, the value of DS2+DS3+DS6 is 2.00 to 3.00, is preferably 2.22 to 2.90, and is more preferably 2.40 to 2.88. The value of DS6/(DS2+DS3+DS6) is 0.28 or more, is preferably 0.30 or more, and is more preferably 0.31 to 0.34. DS2 is a rate at which an acyl group is substituted for a hydrogen atom of a hydroxyl group at position 2 in a glucose unit (hereinafter called acylation degree at position 2). DS3 is a rate at which an acyl group is substituted for a hydrogen atom of a hydroxyl group at position 3 in a glucose unit (hereinafter called acylation degree at position 3). DS6 is a rate at which an acyl group is substituted for a hydrogen atom of a hydroxyl group at position 6 in a glucose unit (hereinafter called acylation degree at position 6).

The cellulose acylate according to the present invention may use only one type of acyl group or two or more types of acyl groups. In using two or more types of acyl groups, it is preferable that one of them is an acetyl group. When DSA refers to the total sum of degree at which an acetyl group is substituted for hydroxyl groups at positions 2, 3, and 6 and DSB refers to the total sum of degree at which an acyl group except for an acetyl group is substituted for hydroxyl groups at positions 2, 3, and 6, the value of DSA+DSB is 2.22 to 2.90, and is preferably 2.40 to 2.88.

DSB is 0.30 or more, and is preferably 0.7 or more. DSB contains a substituent for a hydroxyl group at position 6 at 20% or more, preferably at 25% or more, further preferably at 30% or more, and especially preferably at 33% or more. Furthermore, the value of DSA+DSB at position 6 of cellulose acylate is 0.75 ore more, is preferably 0.80 or more, and is more preferably 0.85 or more. Using such cellulose acylate makes it possible to prepare a solution (dope) which is further superior in resolvability. Especially, using no chlorine-based organic solvent makes it possible to prepare dope which is superior in resolvability and filterability with low viscosity.

Cellulose being a material of cellulose acylate may be obtained by either linters or pulps.

An acyl group with a carbon number of 2 or more of cellulose acylate according to the present invention may be either an aliphatic group or an aryl group, and is not limited. There are, for example, alkyl carbonyl ester, alkenyl carbonyl ester, aromatic carbonyl ester, aromatic alkylcarbonyl ester, and the like, and each of them may further have a substituent. As a preferable example of them, there are a propionyl group, a butanoyl group, a pentanoyl group, a hexanoyl group, an octanoyl group, a decanoyl group, a dodecanoyl group, a tridecanoyl group, a tetradecanoyl group, a hexadecanoyl group, an octadecanoyl group, an iso-butanoyl group, a t-butanoyl group, a cyclohexanecarbonyl group, an oleoyl group, a benzoyl group, a naphthylcarbonyl group, a cinnamoyl group, and the like. Out of these, a propionyl group, a butanoyl group, a dodecanoyl group, an octadecanoyl group, t-butanoyl group, an oleoyl group, a benzoyl group, a naphthylcarbonyl group, a cinnamoyl group, and the like are more preferable, and a propionyl group and a butanoyl group are especially preferable.

[Solvent]

As a solvent for preparing dope, there are aromatic hydrocarbon (for example, benzene, toluene, and the like), hydrocarbon halide (for example, dichloromethane, chlorobenzene, and the like), alcohol (for example, methanol, ethanol, n-propanol, n-butanol, a diethylene glycol, and the like), ketone (for example, acetone, methyl ethyl ketone, and the like), ester (for example, methyl acetate, ethyl acetate, propyl acetate, and the like), ether (for example, tetrahydrofuran, methyl cellosolve, and the like), and the like. In the present invention, dope means a polymer solution or a dispersed solution which is obtained by solving or dispersing polymers in a solvent.

Out of the above hydrocarbon halide, hydrocarbon halide with 1 to 7 carbon atoms is preferably used and dichloromethane is the most preferable. In terms of physical properties such as solubility of TAC, ease of stripping the cast film from the support, and the mechanical strength and optical properties of the film, it is preferable that one or plural types of alcohol with 1 to 5 carbon atoms is mixed into dichloromethane. The contained amount of alcohol is 2 to 25 wt. % with respect to the total amount of a solvent, and is preferably 5 to 20 wt. %. As alcohol, there are methanol, ethanol, n-propanol, isopropanol, n-butanol, and the like. Methanol, ethanol, n-butanol, or a mixture of them is preferably used.

Recently, a solvent composition which does not use dichloromethane is studied for the purpose of minimizing adverse effect on the environment. In this case, ether with 4 to 12 carbon atoms, ketone with 3 to 12 carbon atoms, ester with 3 to 12 carbon atoms, or alcohol with 1 to 12 carbon atoms is available. There are some cases where these chemicals are properly mixed and used, and there are, for example, mixed solvents of methyl acetate, acetone, ethanol, or n-butanol as examples of it. Ether, ketone, ester, and alcohol may have ring structure. A chemical compound which has two or more functional groups of ether, ketone, ester, or alcohol (that is, —O—, —CO—, —COO—, or —OH) is also available as a solvent.

Details on cellulose acylate is described in Japanese Patent Laid-Open Publication No. 2005-104148 from paragraph [0140] to [0195] and these description is applicable to the present invention. Details on solvents and additives such as a plasticizer, a deterioration inhibitor, an ultraviolet absorbing agent, an optical anisotropy controller, a retardation controller, a dye, a matting agent, a stripping agent, and a release improver are described in Japanese Patent Laid-Open Publication No. 2005-104148 from paragraph [0196] to [0516] in a like manner and the description is also applicable to the present invention.

Practical examples of the present invention will be hereinafter described. The following practical examples 1 to 4 describe experiments embodying the present invention, and a comparative example 1 is an experiment for comparison with the practical examples 1 to 4. Details of the experiments such as the compound of dope and a film manufacturing procedure are described in the practical example 1, and descriptions of identical items are omitted in the practical examples 2 to 4 and the comparative example 1.

PRACTICAL EXAMPLE 1

A practical example of the present invention will be described. The compound of a polymer solution (dope) used for manufacturing a film is described below.

[Preparation of Dope]

A formula of a chemical compound used for preparing dope 24 is as follows:

| | |
|---|---|
| A solid matter (solute) having components of Cellulose triacetate (substitution degree of 2.8) | 89.3 wt. % |
| Plasticizer A (triphenyl phosphate) | 7.1 wt. % |
| Plasticizer B (biphenyl diphenyl phosphate) | 3.6 wt. % |
| was appropriately added to a mixed solvent made of | |
| dichloromethane | 80.0 wt. % |
| methanol | 13.5 wt. % |
| n-butanol | 6.5 wt. % | and was stirred and dissolved to prepare the dope 24. The dope 24 was so controlled as to have a TAC concentration of approximately 23 wt. %. After the dope 24 was filtered by a filter paper (#63LB made by Toyo Roshi Co., Ltd.), the dope 24 was further filtered by a sintered metal filter (06N made by Nippon Seisen Co., Ltd., a nominal pore diameter of 10 μm). Then, the dope 24 was contained in a stock tank 20 after being filtered by a mesh filter.

[Cellulose Triacetate]

In cellulose triacetate used here, the amount of remaining acetic acid was 0.1 wt. % or less. The percentage of Ca content was 58 ppm, Mg content was 42 ppm, and Fe content was 0.5 ppm. The cellulose triacetate further contained free acetic acid of 40 ppm and sulfuric acid ions of 15 ppm. The substitution degree of an acetyl group for hydrogen of a hydroxyl group in position 6 was 0.91. 32.5% of the total acetyl groups had been substituted for hydrogen of hydroxyl groups in position 6. The amount of matter extracted from TAC by acetone was 8 wt. % and the ratio of weight-average molecular weight/number-average molecular weight was 2.5. The obtained TAC has a yellow index of 1.7, haze of 0.08, and transparency of 93.5%. The TAC was prepared from cellulose extracted from cotton.

A film 22 was manufactured in a film manufacturing line 10 shown in FIG. 1. As shown in FIG. 7, a cutout 100 was provided in a peripheral surface of distribution pins 96b and 96c. In the cutout 100, the value of W1/W2 was 13 and the value of D1/(D1−D2) was 1.5. As shown in FIGS. 4 and 9, a feed block 51 provided with the distribution pins 96b and 96c and a casting die 52 having a value of W4/W3 of 30 were used as a casting device.

Referring to FIG. 1, the casting die 52 was provided with a jacket (not illustrated) and the temperature of a heat exchange medium supplied into the jacket was controlled for the purpose of keeping multilayer dope 61 at constant temperature of approximately 34° C. Under the control of a controller 60, a peripheral surface 54b traveled in a Z1 direction at a speed ZV of approximately 30 m/min by the rotation of a shaft 54a. Under the control of the controller 60, a temperature controller 56 kept the peripheral surface 54b of a support drum 54 at constant temperature TS of approximately −10° C. The concentration of oxygen in dried atmosphere above the support drum 54 was maintained at 5 vol %. To maintain the concentration of oxygen at 5 vol %, a nitrogen gas was substituted for air. A decompression chamber 63 reduced pressure on a rear side of a casting bead, and so controlled difference in pressure between a front side and a rear side of the casting bead that the length of the casting bead came to be 20 mm to 50 mm.

Pumps 31a to 31c sent the dope 24 contained in the stock tank 20 to the feed block 51 through dope conduits 30a to 30c as dope 39a to 39c. The feed block 51 formed the multilayer dope 61 out of the dope 39a to 39c and sent the multilayer dope 61 to the casting die 52. The casting die 52 casted the multilayer dope 61 onto the peripheral surface 54b in such a manner as to make the thickness of the film 22 be 100 μm. Accordingly, a cast film 53 (refer to FIG. 10) in which the value of Dc/Da was 18 and the value of Db/Da was 18 was formed on the peripheral surface 54b.

After the cast film 53 is hardened to have a self-supporting property by cooling, the cast film 53 was stripped from the support drum 54 as a wet film 68 by using a stripping roller 55. In order to prevent poor stripping, film stripping speed (stripping roller draw) was appropriately conditioned within a range of 100.1% to 110% of the speed of the support drum 54.

The stripping roller 55 guided the wet film 68 to a transfer portion 65. In the transfer portion 65, the wet film 68 was subjected to dry air of approximately 60° C. and dried. A roller 66 provided in the transfer portion 65 leaded the wet film 68 into a pin tenter 13.

In the pin tenter 13, the wet film 68 was subjected to dry air. Thus, the wet film 68 was dried to be a film 22. Then, the pin tenter 13 sent the film 22 into a clip tenter 14. In the clip tenter 14, the film 22 was stretched in a width direction with being dried by dry air.

Edge slitters 70a and 70b slit away both side edges of the film 22 sent from the pin tenter 13 and the clip tenter 14. The both side edges with a width of approximately 50 mm were cut by NT cutters. Then, cutter blowers (not illustrated) blew the cut side edges into crushers 71a and 71b to crush them into chips of approximately 80 mm² on average. The chips were recycled as a material for preparing dope together with TAC flakes.

The film 22 which had passed through the edge slitter 70b was sent to a drying chamber 15. The amount of solvent remaining in the film 22 sent out of the edge slitter 70b was approximately 10 wt. % by a dry base. In the drying chamber 15, the film 22 was subjected to dry air of approximately 140° C. to be dried. The width of the film 22 was 3000 mm.

After that, the film 22 was carried to a winding chamber 17. The winding chamber was kept at a room air temperature of 28° C. and a humidity of 70%. In the winding chamber 17, an ionic-wind neutralization device (not illustrated) was so installed as to make the electrostatic potential of the film 22 from −1.5 kV to +1.5 kV. In closing, a winder 84 in the winding chamber 17 wound the film 22 up while a press roller 83 applied desired tension to the film 22.

PRACTICAL EXAMPLE 2

A film 22 was manufactured similarly to the practical example 1 by using a feed block 51 having different distribution pins 96b and 96c. Each of the distribution pins 96b and 96c had a cutout 100 in which the value of W1/W2 was 30 and the value of D1/(D1−D2) was 5.

PRACTICAL EXAMPLE 3

A film 22 was manufactured similarly to the practical example 1 by using a feed block 51 having different distribution pins 96b and 96c. Each of the distribution pins 96b and 96c had a cutout 100 in which the value of W1/W2 was 10 and the value of D1/(D1−D2) was 1.

PRACTICAL EXAMPLE 4

A film 22 was manufactured similarly to the practical example 1 by using a feed block 51 having different distribution pins 96b and 96c. Each of the distribution pins 96b and 96c had a cutout 100 in which the value of W1/W2 was 35 and the value of D1/(D1−D2) was 6.

COMPARATIVE EXAMPLE

A film 22 was manufactured similarly to the practical example 1 by using a feed block having distribution pins each of which had a cutout 100 without a ledge 102.

Evaluation

Table 1 shows the conditions of individual practical examples and comparative example and evaluation results on the following evaluation items. The evaluation results of the individual evaluation items are based on the following criteria.

[Evaluation of the Presence or Absence of Remaining Cast Film]

As for evaluation of the cast film 53 remaining on the support drum 54 without being stripped, "good" represents a case where there was no cast film 53 remaining on the support drum 54. "Fair" represents a case where the cast film 53 was available as a film even though the cast film 53 had remained on the support drum 54. "Poor" represents a case where the cast film 53 remained and ruptured.

[Evaluation of the Presence or Absence of Bubble]

As for the presence or absence of a bubble, "good" represents a case where there was no bubble occurring in the cast film 53 or the wet film 68. "Fair" represents a case where the cast film 53 was available as a film even though a bubble had occurred therein. "Poor" represents a case where a bubble occurred and the cast film 53 ruptured at a bubbled portion.

TABLE 1

|  | W1/W2 | D1/(D1-D2) | W4/W3 | Evaluation result Presence or absence of remaining cast film | Presence or absence of babble |
|---|---|---|---|---|---|
| Practical example 1 | 13 | 1.5 | 30 | Good | Good |
| Practical example 2 | 30 | 5 | 30 | Good | Good |
| Practical example 3 | 10 | 1 | 30 | Fair | Fair |
| Practical example 4 | 35 | 6 | 30 | Fair | Fair |
| Comparative example 1 | — | — | 30 | Poor | Poor |

According to table 1, it was found out that using a casting device having distribution pins of the present invention made it possible to manufacture a multilayer film with preventing a wraparound phenomenon.

What is claimed is:

1. A solution casting apparatus for manufacturing a polymer film comprising:

a casting support travelling at a speed of at least 30 m/min for forming a multilayer casting film thereon;

a feed block for forming a multilayer dope flow by merging a second dope flow into a first dope flow, which are independently led, at a joint portion;

a distribution pin provided in said joint portion for controlling the volume of said second dope flow, said distribution pin having a cutout, a ledge being provided at an end of said cutout in a second direction, said second direction coinciding with a width direction of said casting film, said ledge reducing the volume of said second dope flow flowing through said cutout at an end in said second direction as compared with that in a middle portion;

a casting die for extending the width of said multilayer dope flow led from said feed block in said second direction and ejecting said multilayer dope flow out of an outlet onto said casting support; and a drying device for drying said casting film stripped from said casting support to be said polymer film; and wherein said ledge is projected from a side face toward a middle portion of said cutout, said ledge satisfies the following expressions:

$$13 \leq W1/W2 \leq 30$$

$$1.5 \leq D1/(D1-D2) \leq 5$$

wherein, W1 represents the width of said cutout, W2 represents the width of said ledge, D1 represents the depth of said cutout, and D2 represents the depth of said ledge.

2. The solution casting apparatus as recited in claim 1 satisfying the following expression:

$$10 \leq W4/W3 \leq 30$$

wherein, W3 represents the length of said joint portion in said second direction and W4 represents the length of said outlet in said second direction.

* * * * *